(12) United States Patent
Hildingsson

(10) Patent No.: US 8,598,472 B2
(45) Date of Patent: Dec. 3, 2013

(54) EMC PROTECTED COMPRESSION UNIT AND A SEALING SYSTEM COMPRISING SUCH COMPRESSION UNIT

(75) Inventor: Ulf Hildingsson, Nättraby (SE)

(73) Assignee: Roxtec AB, Karlskrona (SE)

(*) Notice: Subject to any disclaimer, the term of this patent is extended or adjusted under 35 U.S.C. 154(b) by 29 days.

(21) Appl. No.: 13/375,241

(22) PCT Filed: May 20, 2010

(86) PCT No.: PCT/SE2010/050549
§ 371 (c)(1),
(2), (4) Date: Nov. 30, 2011

(87) PCT Pub. No.: WO2010/147534
PCT Pub. Date: Dec. 23, 2010

(65) Prior Publication Data
US 2012/0073872 A1  Mar. 29, 2012

(30) Foreign Application Priority Data
Jun. 18, 2009  (SE) ...................................... 0950475

(51) Int. Cl.
*H02G 3/14* (2006.01)
*H02G 3/18* (2006.01)

(52) U.S. Cl.
USPC .......................................... 174/657; 174/362

(58) Field of Classification Search
USPC .................. 174/362, 366, 652, 657
See application file for complete search history.

(56) References Cited

U.S. PATENT DOCUMENTS

| | | | | |
|---|---|---|---|---|
| 3,830,954 A * | 8/1974 | Caudill | ........................ | 174/362 |
| 4,358,632 A * | 11/1982 | Buch | ............................. | 174/360 |
| 4,656,313 A * | 4/1987 | Moore et al. | .................. | 174/362 |
| 4,677,253 A * | 6/1987 | Blomqvist | .................... | 174/362 |
| 4,733,016 A * | 3/1988 | Twist et al. | ..................... | 174/657 |
| 5,493,068 A * | 2/1996 | Klein et al. | .................... | 174/362 |
| 5,938,152 A | 8/1999 | Kreutz | | |
| 5,939,676 A * | 8/1999 | Birmingham et al. | ........ | 174/656 |
| 6,875,926 B2 | 4/2005 | Buekers et al. | | |
| 8,096,562 B2 * | 1/2012 | Johansson et al. | ............ | 277/630 |
| 2004/0144555 A1 | 7/2004 | Buekers et al. | | |
| 2010/0025941 A1 | 2/2010 | Hedstrom | | |

FOREIGN PATENT DOCUMENTS

| | | |
|---|---|---|
| DE | 29507446 U1 | 9/1995 |
| DE | 19602760 A1 | 7/1997 |
| EP | 1479958 A1 | 11/2004 |
| EP | 1484541 A1 | 12/2004 |
| WO | WO-9611353 A1 | 4/1996 |
| WO | WO-2004051338 A1 | 6/2004 |
| WO | WO-2008091219 A1 | 7/2008 |

* cited by examiner

*Primary Examiner* — Hung Ngo
(74) *Attorney, Agent, or Firm* — Harness, Dickey & Pierce, P.L.C.

(57) ABSTRACT

A compression unit for a modular sealing system including a compression assembly being arranged to expand in one direction as it is compressed in another direction and including an electrically conductive flexible sheet enclosing one end of the compression assembly.

15 Claims, 5 Drawing Sheets

EMC PROTECTED COMPRESSION UNIT AND A SEALING SYSTEM COMPRISING SUCH COMPRESSION UNIT

TECHNICAL FIELD

The present invention concerns compression unit for a sealing system used for seal, lead-through or transit for cables or pipes. The invention especially concerns such compression unit adapted for shielding from electromagnetic disturbances and a sealing system comprising such compression unit.

PRIOR ART

In the prior art there are cable transitions or the like having a frame, inside which a number of modules to receive cables, wires or pipes are placed. The modules are made of an elastic material e.g. rubber or plastics and are thus compressible. Inside the frame normally a number of modules are received side by side in one or more rows together with some kind of compression unit. The compression unit is placed between the frame and the modules in such a way that when the compression unit is expanded the compressible modules will be compressed around the cables, wires or pipes. For ease of description the expression "cable" or "service" is mainly used in this description, but it should be construed broadly and a person skilled in the art realises that it normally also covers pipes or wires.

Another type of seal, cable transition, pipe penetration etc. has a general cylindrical form and is to be received in a sleeve in a wall or an opening in a wall. To function in the desired way the seal should fit snugly into the sleeve or the opening of the wall in which it is received and the seal should be adaptable to the actual mounting dimension. The mounting dimension is dictated by the inner diameter of the sleeve or the opening. The seal has a cylindrical compressible body, which is compressed axially between fittings at the opposite ends of the compressible body. By the axial compression the cylindrical body will expand radially both inwards and outwards.

Seals or transitions of both the above kinds are used for sealing in many different environments, such as for cabinets, technical shelters, junction boxes and machines. They are used in different industrial environments, such as automotive, telecom, power generation and distribution, as well as marine and offshore. The seals or transitions may have to seal against fluid, gas, fire, rodents, termites, dust, moisture etc., and may receive cables or wires for electricity, communication, computers etc., pipes for different gases or liquids such as water, compressed air, hydraulic fluid and cooking gas or wires for load retention.

The parts receiving a single cable etc. of both the types discussed above often have a stack of peelable layers or sheets on the inside. The layers or sheets are peeled off until the inner diameter of the part is adapted to the outer diameter of the cable received in said part. The sheets adhere strong enough to each other to stay together and at the same time loose enough to enable the sheets to be peeled off from the stack, either one-by-one or a number of sheets together. In some embodiments there are also peelable layers or sheets on the outside, making it possible to adapt the outer dimensions of for instance a circular seal to a specific opening or sleeve.

A person skilled in the art realises that the exact shape and form of the different parts, including the layers, may vary without departing from the gist of the present invention. For example the pack of layers may have another cross sectional form than circular.

Normally, one or more compressible modules are arranged in an opening. Thereafter the modules are compressed to achieve a tight fit between individual modules, and between a single module and the cable or pipe arranged therein. The applicant utilizes two main strategies for achieving compression, yet the present invention is not limited to those strategies. The first strategy involves arranging a compression unit together with the modules within the constraints of the frame. The compression unit is thereafter mechanically expanded, and compresses the compressible modules. This type of compression unit is described in several applications by the present applicant. The second strategy involves arranging a resilient body between two compression plates, and arranging the compressible modules in an opening in the resilient body. Compression of the resilient body by means of the compression plates will make it expand, and as it expands it will compress the compressible modules. This strategy is also described in several applications by the present applicant. There are other examples of compression units, and the present invention should obviously not be limited to any particular type of compression unit.

The compression unit compresses all modules, which means that while each module only is compressed to a small degree, the compression unit may have to be expanded substantially.

The modules, as well as the rest of the system, may be designed to enhance particular properties of the sealing system of which they constitute a part. Examples of properties may include fire restriction, sealability, mechanical friction, pressure resistance, explosion resistance, shielding against electromagnetic disturbances, etc.

In some installations it is vital to dampen electromagnetic disturbances to protect different electrical or electronic equipments on the inside or outside of the wall, partition etc. receiving the frame. Both disturbances going along the screen of a cable or pipe and electromagnetic radiation that may cause RFI (Radio Frequency Interference) are possible to dampen at systems of the type described above.

Electrical and electronic devices are more or less sensitive to electromagnetic disturbance caused by electromagnetic radiation. Electromagnetic disturbance may be caused by the electromagnetic radiation which often is emitted by electrical circuits carrying rapidly changing signals, as a by-product of their normal operation, and which causes unwanted signals (interference or noise) to be induced in other circuits. This interrupts, obstructs, or otherwise degrades or limits the effective performance of those other circuits. It can be induced intentionally, as in some forms of electronic warfare, or unintentionally, as a result of spurious emissions and responses, intermodulation products, and the like.

Cables used in environments were it is required to guarantee protection against RFI normally have a screen, in the form of a conductive layer, surrounding the cable conductor(s), as a protection against electromagnetic disturbance. In order to be efficient, a cable screen must be able to carry currents generated by electromagnetic disturbance away from the cable, which is achieved by grounding of the cable screen. Proper grounding is crucial for obtaining good protection from electromagnetic disturbance, and is a vital part of all electronic and electrical design. There is a relationship between the efficiency of grounding and the damping achieved.

To minimize radio frequency interference and dampen electromagnetic radiation some kind of waveguide (wave trap) and/or a RFI screen should be formed. The waveguide should be grounded.

Today there exist different types of so-called EMC modules. EMC stands for electromagnetic compatibility, i.e. the ability of electrical or electronic devices to function properly in their intended electromagnetic environment. EMC modules are provided with some kind of waveguide and/or a RFI screen and an electrical contact to the cable screens to tap off cable screen borne electromagnetic disturbance/interference to ground. The waveguide is normally some kind of conductive material formed as a pipe, duct or alike, the purpose of which is to act as a trap for RFI. The RFI screen goes normally vertically through the entire EMC module. One example may be an RFI screen made of glass beads coated with silver and placed in a rubber material. Normally, an opening is made in the RFI screen to let a cable or pipe through. The conductive material in contact with the cable screen may be cupper with a tin coating. To have a good connection the conductive material should have a certain length and preferably go 360° around the cable screen. Furthermore, in many installations today a special cover of conductive material has to be placed on or in the compression unit to guarantee protection against RFI and proper grounding of any protruding bolts.

In many military applications, at oilrigs, in hospitals, on board airplanes, on board ships, in different types of vehicles, in some industries and so on there may be certain areas that are more sensitive to disturbances, i.e. it is very grave if these areas are knocked out. Such areas need a more efficient damping than other areas. In many instances it is also desirable to dampen equipment on the inside of the frame to hinder espionage or other unwanted surveillance.

The damping effect is measured in dB, for instance according to the standard IEEE 299 or MIL-STD 285. There exist a number of equipments giving some damping of electromagnetic disturbances. The damping effect is in many cases increased by a relatively complex set of modified components and handling steps. However, by the known equipments it is hard to achieve a damping exceeding about 60 dB, when cables are received. However, for sensitive areas the damping should be at least 60 dB or preferably more.

One particular element being difficult to shield in a practical manner is the compression unit, since this unit often comprises an assembly that expands during use.

One solution which is used presently is to retrofit a metal cover, covering the full extension of the compression unit when in a fully expanded state, thus compressing existing modules to the desired extent. Though effective, this solution may be somewhat cumbersome, since it requires an additional component and extra work effort.

Another solution is disclosed in EP-A-1 484 541, where a pleated screen is arranged inside a compression unit. As the compression unit expands the pleated screen will unfold and still provide screening. Though fulfilling its purpose the system requires a rather complicated manufacturing process. Further, the integrity, and the mere existence of the pleated screen is not easily verifiable.

In EP-A-1 479 958 a third known solution is disclosed. According to this solution components of the compression unit may be vacuum coated with an electrically conductive coating, such as with a metal alloy. The solution has proven to be efficient, yet it requires a somewhat complicated manufacturing method, which of course will affect the cost of the resulting product. The present invention aims at providing an improved, and in many ways simplified, solution for the achievement of shielding against electromagnetic disturbances.

SUMMARY

An inventive compression unit according to claim 1 is characterized in that a conductive flexible sheet encloses one end of the compression assembly, such that it provides full shielding in one direction and adequate electrical contact in other directions.

The characterizing feature results in several beneficial effects, such as:

The sheet may be retrofitted to an existing compression unit, resulting in that a tailor made compression unit does not have to be provided.

The original demands on the frame will be fulfilled.

The integrity of the sheet, and thus the shielding ability of the system may be readily evaluated visually.

The sheet may be sized to accept a substantial compression/expansion of the compression unit, and is not as susceptible to fatigue or wear as some prior art solutions.

The manufacture of the compression unit does not have to be altered.

If a new design of the compression unit is developed the sheet is easily adjusted, if an adjustment is at all needed, to the new design.

In one or more embodiments the flexible sheet is a mesh. Using a mesh allows for resilient material of the compression assembly to protrude between the threads, which supports sealing properties and increases friction against contacting surfaces. Also, a mesh is more resilient than a sheet, for corresponding material dimensions, i.e., a mesh made from wires having 0.3 mm diameter is more resilient and "forgiving" than a 0.3 mm sheet made of the same material.

In another embodiment the conductive mesh is fully or partly embedded in the compression unit and connection means ensure that there is electrical contact between the mesh and ground at one end, and with the mesh and cable screens at another end. The contact means may be provided by the mesh itself, or by other components in electrical contact with the mesh, e.g., connectors. The ultimate contact between the shielding of individual cable screens and the mesh affects grounding properties, and may be effected via existing stayplates etc. The concept is easily grasped starting from one extreme: If a frame or an opening is covered with a homogeneous conductive plate, in connection with ground, there will be virtually no leakage of electromagnetic radiation. Any step away from this extreme will reduce the shielding properties. It is therefore beneficial if all adjacent components (frame/compression unit/stayplate/module/cable) are electrically connected throughout their entire contact area, in a low resistance connection, and that all components are connected to ground (optionally via other components). If e.g. the stayplate are not in good electrical contact with the adjacent modules, there will be a "slit" through which the electromagnetic radiation may pass. It should be obvious that there are many embodiments where not all of the above components are used, the stay plate may, e.g., be omitted in some embodiments. Still, the electrical contact between adjacent components is the important issue. It should also be noted that the degree of shielding necessary may vary, such that some leakage may be accepted. The present invention should therefore not be limited to a situation where all adjacent components are in electrical contact.

"Encloses", "enclose", "enclosing" and so forth, means that the mesh covers the end of the compression assembly and portions of neighboring surfaces, which is believed to correspond to the common definition. In one or more embodiments the compression assembly may be penetrated by e.g. screw means. In such a case the screw means may also penetrate the mesh, yet the mesh is still considered to enclose one end of the compression assembly.

In one embodiment the compression assembly comprises two compressible wedges made of rubber or similar resilient material, that may be moved away and towards each other by means of screw means, and two further compressible wedges that can also be moved towards and away from each other and which co-act with the two first mentioned wedges. In one or more embodiments the four wedges may be held together by a flexible strap, and may be formed in one piece with said strap, to form an easily handled pack with the wedges together forming a contained component which can be easily fitted into a frame. Except for the shielding properties such a compression assembly is disclosed in WO 96/11353 (hereby incorporated by reference), and relevant details described therein, referring to the construction of the compression assembly is considered to form part of this application too. In this context it should be noted that there are other types of compression units that may be used, and that they fall within scope of the present invention, as defined by the appended claims.

DESCRIPTION OF EMBODIMENTS

Figure 1:
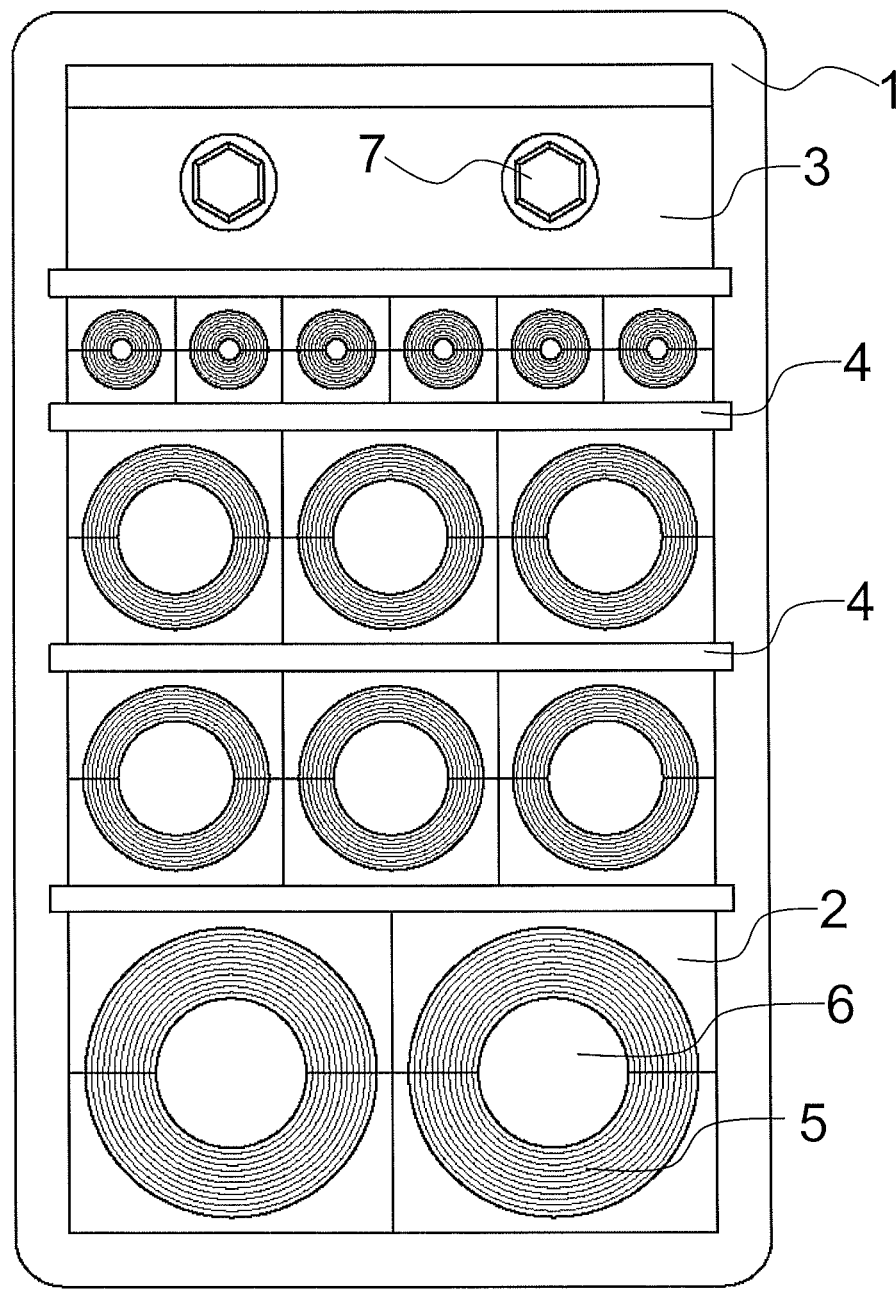
FIG. 1 is a front view of a sealing system provided with a compression unit according to a first embodiment of the present invention.

FIG. 1 illustrates a sealing system comprising a compression unit according to a first embodiment of the present invention, seen from a first side. The system comprises a frame 1, in which compressible modules 2 are arranged. The compression modules 2 have peelable layers 5 of material in order to be adaptable to the dimensions of a service, such as a pipe or cable, arranged therein. A rubber core 6 is arranged to provide sealing and to position the peelable layers 5 if a service is not arranged. Stay plates 4 are located between the rows of compressible modules 2. The stay plates 4 are slidably arranged and act to position the compressible modules 2 and to distribute the compression from the compression unit 3. The compression unit 3 shown in the view of FIG. 1 resembles compression units according to prior art. The screws 7, of which the heads are visible, are used to expand the compression unit 3 in a manner described in a following paragraph, referring to FIG. 2.

Figure 2:
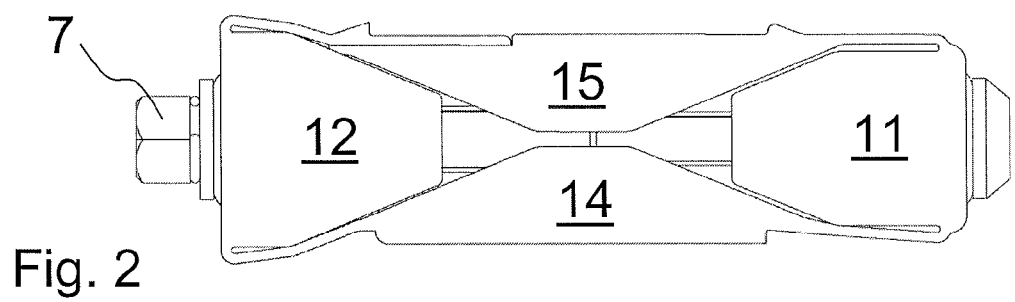
FIG. 2 is a side view of a compression unit according to a first embodiment of the present invention, without the conductive mesh.

FIG. 2 illustrates a side view of a compression unit according to prior art, which may simplify the understanding of the compression unit 3 of FIG. 1. The screw heads 7 are visible on the left side of FIG. 2. The compression unit has a compression assembly comprising two opposing wedges 11, 12 interconnected by the screw 7. By forcing these wedges 11, 12 towards or away from each other, two coacting wedges 14, 15 may be forced away or towards each other. A reduction in a horizontal dimension thus results in an expansion in a vertical direction, whereby the compressible modules may be compressed. The compression unit 3 described thus far is thoroughly described in the previously cited WO application.

Figure 3B:
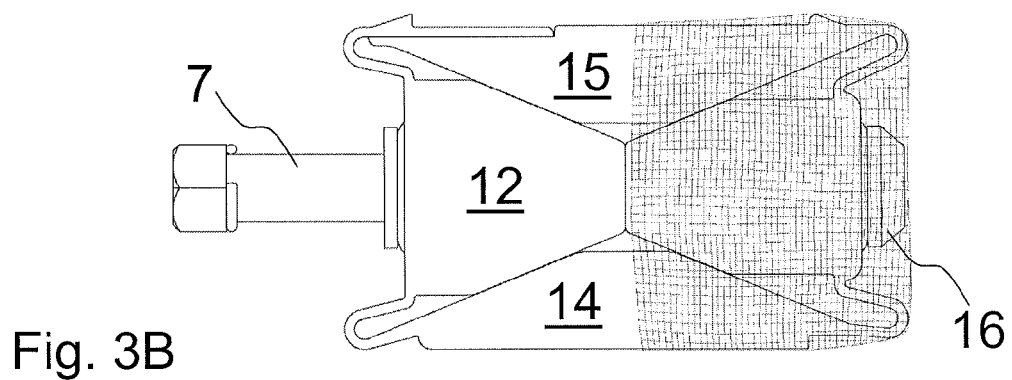
FIGS. 3A and B are side views of a compression unit according to the first embodiment of the present invention, in a relaxed state and compressed state, respectively.
Figure 3A:
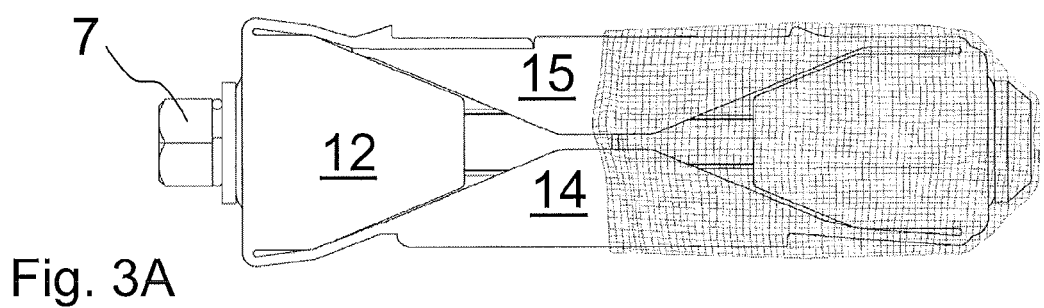

FIGS. 3A and 3B illustrate how an electrically conductive mesh 16 is arranged such that it encloses one end of the compression assembly. In this context it may be emphasized that the 'compression assembly' is a subunit of the 'compression unit', such that the compression unit comprises the compression assembly as well as other components such as screws, fittings etc. The conductive mesh 16 has such an extension that it comes into contact with the frame, which is arranged on the upper, lower and lateral sides of the compression unit, and that it blocks electromagnetic disturbances propagating through the compression unit (from left to right, or vice versa, in FIG. 3). The compression unit itself may be positioned anywhere in the frame; top, bottom or there between.

Figure 4:
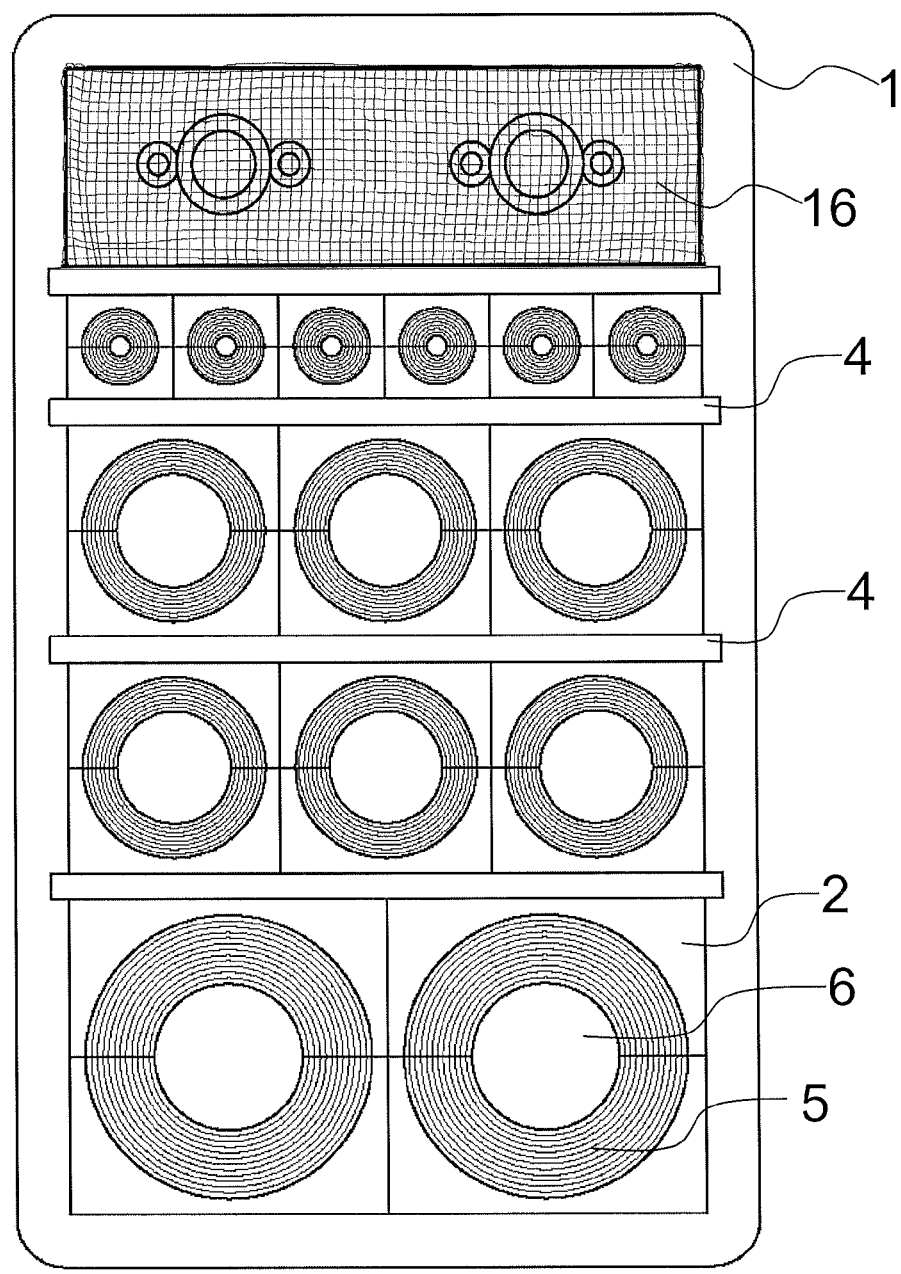
FIG. 4 is a view of the sealing system of FIG. 1, from the opposite direction.

FIG. 4 shows the sealing system of FIG. 1 from the opposite direction.

Figure 5:
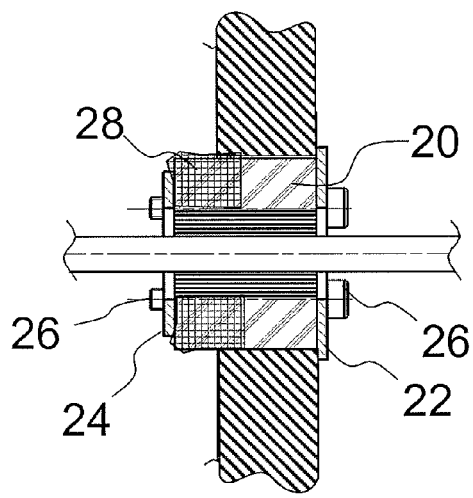
FIGS. 5 and 6 are side views, partly in section of compression unit according to a second embodiment of the present invention.
Figure 6:
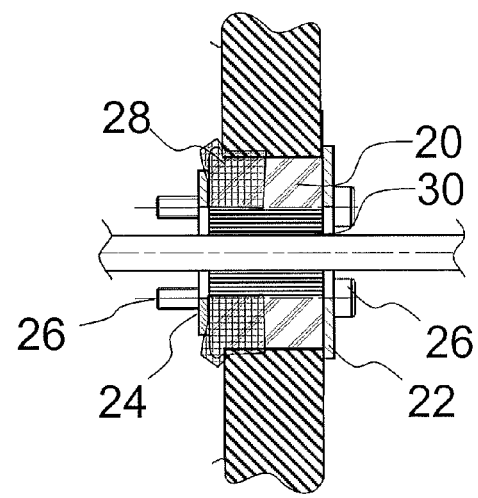
Figure 7:
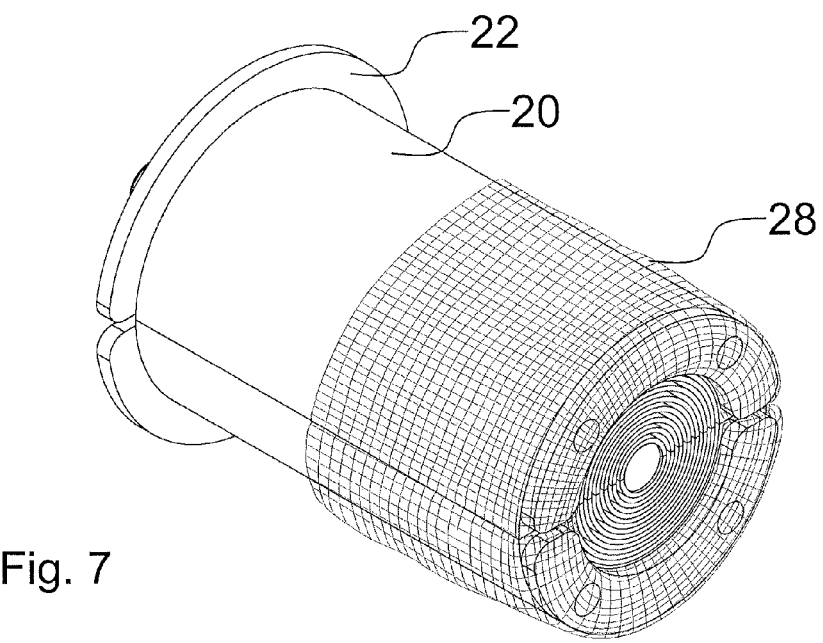
FIG. 7 is a perspective view of a sealing system similar to the one of FIGS. 5 and 6.

FIGS. 5 and 6 show a second embodiment of the present invention, in which a compression assembly having a cylindrical outer surface is used. The compression unit utilizing such a compression assembly, or compressible body 20, is well described in several applications by the present applicant. Only details of the construction that simplifies the understanding of the present invention will be described here. At either end of the compressible body 20 a fitting 22, 24 may be arranged. The fittings 22, 24 are interconnected by compression means, such as screws 26 that may be tightened in order to achieve compression. When compressed in the axial direction the compressible body will expand in the radial direction, thus achieving sealing radially inwards and outwards, and also secures the service arranged therein and relative to the opening in the construction in which it is arranged, which is illustrated in FIG. 6. A similar type of mesh 28 is arranged in this case. It should be noted that the cross sections of FIGS. 5 and 6 do not give a true appearance of the mesh 28, and in particular the appearance of the mesh is not true cross sectional view and should only be considered as an indication for simple understanding of the construction. A more formally correct illustration is disclosed in the embodiment shown in perspective in FIG. 7. In the embodiment of FIGS. 5 and 6 the mesh 28 extends from a location at the outer perimeter of the compressible body and extends to a location on the outer perimeter of the outermost peelable layer of material 30. If the peelable layers of material are not conductive, the mesh may instead extend to a location on the inner perimeter of the innermost peelable layer of material. This enclosure of the compression assembly may provide an adequate shielding, and would have the advantage that neither the compressible body, nor the peelable sheets of material 30 would need to be provided with conductive properties. In the embodiment of FIG. 7 the mesh is arranged to also enclose the fitting and compression means at one end of the compressible body, and the same numbering has been used for similar parts.

Figure 8:
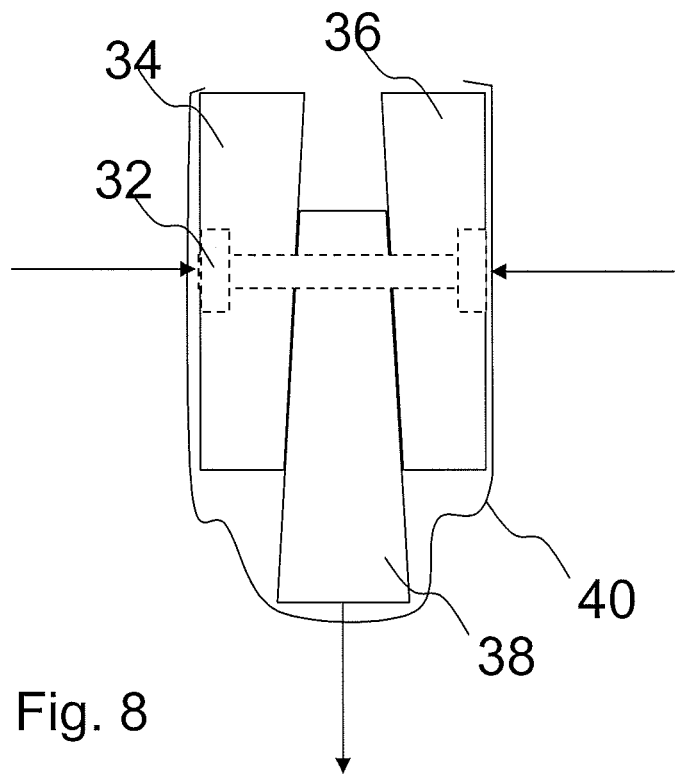
FIG. 8 is a schematic view of a compression unit according to a third embodiment of the present invention.

The schematic view of FIG. 8 illustrates the function of a compression unit according to a third embodiment of the present invention. The function illustrated from one side, as for the compression units of FIGS. 2 and 3. In this embodiment two opposing wedges forces a third wedge, interposed between the two opposing wedges, downwards in order to accomplish compression. The two opposing wedges comprise an opening through which a compression means may extend, and the third wedge comprises an oblong slot for the same purpose. For this compression unit to work the two opposing wedges have to be movable relative to each other. One of them may be attached to, or integral with, a frame, while the other may be movable by fastening means, such as screws, so as to selectively move back and forth towards the first one.

Figure 9:
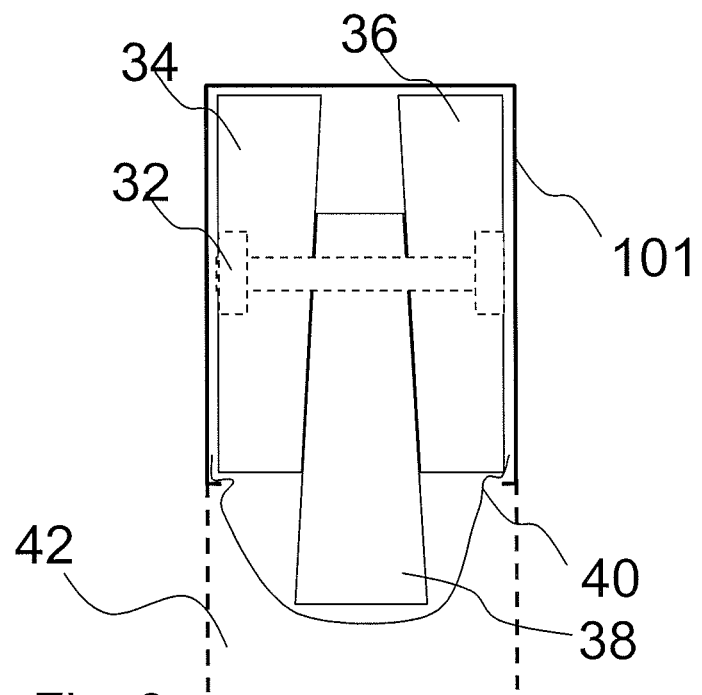
FIG. 9 is a schematic view of an arrangement of the compression unit of FIG. 8 in a frame.

The function of the compression unit is indicted in FIG. 8. As a compression screw 32 is tightened by means of a nut at one end the first and second compression wedges 34, 36 will be pressed towards each other, as indicated by the horizontal arrows in FIG. 8. By means of the slanting surfaces of the compression wedges 34-38, the middle compression wedge 38 will be moved in the direction of the vertical arrow of FIG. 8 when the first and second compression wedges 34, 36 are pressed towards each other. The middle compression wedge 38 is free to move in a vertical direction thanks to the slot (not shown) receiving the compression screw 32 and to the portion of the middle compression wedge 38 having a width that is smaller than the distance between the fixation means of a frame. The middle wedge 38 will move towards and compress the modules inside the opening of the frame. The mesh 40 may in this embodiment be arranged enclosing all of the three wedges 34-38. In another embodiment, where the compression unit is arranged in a frame having a design such that the frame itself provides the necessary shielding of an area corresponding to the extension of the two opposing wedges 34, 36 the mesh may only be arranged enclosing the projecting portion of the middle wedge 38. This is shown in FIG. 9, where the compression unit is arranged in such a frame 101, of which only a portion is shown. The frame may be similar to the frame of FIG. 1, yet the compression unit of FIG. 8 is integrated into the frame 101 to a greater extent. If the frame is made of plastic, the first wedge 34 may even be formed in one piece with the frame 101 in convenient manner. The frame 101 should comprise openings through which the screws 32 may extend or through which a tool may be extended for operating the screws 32. Not shown explicitly in the drawing is how compressible modules are arranged in the opening 42 below the compression unit. It should yet again be noted that the view of FIGS. 8 and 9 are only schematic.

In one embodiment the first and second compression wedges 34, 36 are made of a plastic material, such as PA 66, 306F or similar, while the middle compression wedge 38 is made of a rubber material, such as EPDM, Roxylon or similar. Normally a lubricant is placed on the slanting contact surfaces of the compression wedges 34-38.

The inventive system has somewhat surprisingly proven to be equally or more efficient in terms of attenuation of RFI or electromagnetic radiation than previous solutions. One example is that compared to the solution with the retrofitted metal cover the dampening was improved by 40 dB.

The mesh size may obviously vary and generally have to be adjusted to the wavelength of the electromagnetic waves to be blocked. Other parameters, such as resilience, rigidity etc may depend on the mesh size and the dimensions of the conductors of the mesh, and it is possible to adjust the properties of the mesh without leaving the scope of the present invention as defined by the appended claims.

The invention claimed is:

1. A compression unit for a modular sealing system, comprising:
   a compression assembly arranged to expand in one direction as it is compressed in another direction, an electrically conductive flexible sheet enclosing one end of the compression assembly, the compression assembly including two operative states including,
      a storage state in which the compression assembly is relaxed, and
      a compressive state in which a dimension of the compression assembly is reduced in one dimension and expanded in another dimension for the purpose of achieving adequate seal.

2. The compression unit of claim 1, wherein the conductive flexible sheet is fully or partially embedded in the compression assembly.

3. The compression unit of claim 2, wherein the compression assembly is one compressible body with fittings at either end of the compressible body.

4. The compression unit of claim 2, wherein the compression unit is an integrated part of a frame including an opening adapted to receive one or more modules and forming a transition for services, and is placed in a space under a cover at one end of the opening of the frame, and wherein the compression unit comprises a first compression wedge, a second compression wedge and a middle compression wedge, the compression wedges including slanted mutual contact surfaces.

5. The compression unit of claim 1, wherein the electrically conductive flexible sheet is a mesh.

6. The compression unit of claim 5, wherein the compression assembly is one compressible body with fittings at either end of the compressible body.

7. The compression unit of claim 1, the compression assembly further comprising two compressible wedges which are movable towards and away from each other by way of screw device, and two further compressible wedges which are movable away and towards each other and which co-act with the two first-mentioned wedges.

8. The compression unit of claim 7, wherein the four wedges are held together by a flexible strap which functions to hold the wedges movably in relation to each other, such that the wedges and the screw device together form a contained component.

9. The compression unit of claim 8, wherein the compression assembly is partitioned along one or more slits in the direction of the central axis of symmetry.

10. The compression unit of claim 1, wherein the compression assembly is one compressible body with fittings at either end of the compressible body.

11. The compression unit of claim 10, wherein the compression assembly comprises a compressible body including an essentially cylindrical outer perimeter.

12. The compression unit of claim 10, wherein the compression assembly is partitioned along one or more slits in the direction of the central axis of symmetry.

13. The compression unit of claim 1, wherein the compression unit is an integrated part of a frame including an opening adapted to receive one or more modules and forming a transition for services, and is placed in a space under a cover at one end of the opening of the frame, and wherein the compression unit comprises a first compression wedge, a second compression wedge and a middle compression wedge, the compression wedges including slanted mutual contact surfaces.

14. A sealing system utilizing a compression unit according to claim 1, wherein the flexible sheet is arranged to be in direct physical and electrical contact with a service extending through the sealing system.

15. The compression unit of claim 1, wherein the compression unit is an integrated part of a frame including an opening adapted to receive one or more modules and forming a transition for cables or pipes together with the modules, and is placed in a space under a cover at one end of the opening of the frame, and wherein the compression unit comprises a first compression wedge, a second compression wedge and a middle compression wedge, the compression wedges including slanted mutual contact surfaces.

* * * * *